United States Patent [19]

Kidd

[11] 4,183,078
[45] Jan. 8, 1980

[54] APPROACH SLOPE INDICATORS

[75] Inventor: Samuel M. Kidd, Bedford, England

[73] Assignee: National Research Development Corporation, London, England

[21] Appl. No.: 835,849

[22] Filed: Sep. 22, 1977

[30] Foreign Application Priority Data

Sep. 27, 1976 [GB] United Kingdom ............... 40062/76

[51] Int. Cl.² ............................ B64F 1/20; G08G 5/00
[52] U.S. Cl. ........................................ 362/231; 340/26
[58] Field of Search .......................... 340/26; 362/231

[56] References Cited

U.S. PATENT DOCUMENTS

| 2,567,046 | 9/1951 | Anderson | 362/231 X |
| 2,968,023 | 1/1961 | Ferguson et al. | 340/26 |
| 2,975,400 | 3/1961 | Ferguson et al. | 340/26 |
| 4,064,424 | 12/1977 | Hergenrother | 340/26 X |

Primary Examiner—Leland A. Sebastian
Attorney, Agent, or Firm—Cushman, Darby & Cushman

[57] ABSTRACT

An indicator unit for use at the edge of airfield runways which produces a split beam of light, the interface of which may be adjusted to the required angle of flight path to guide incoming aircraft, the indicator unit comprising a support assembly having mounted therein at least two projection tubes, each projection tube housing a removable pre-aligned projector having a light source, a red-passing filter and a divergent lens disposed to produce the split beam of light.

15 Claims, 6 Drawing Figures

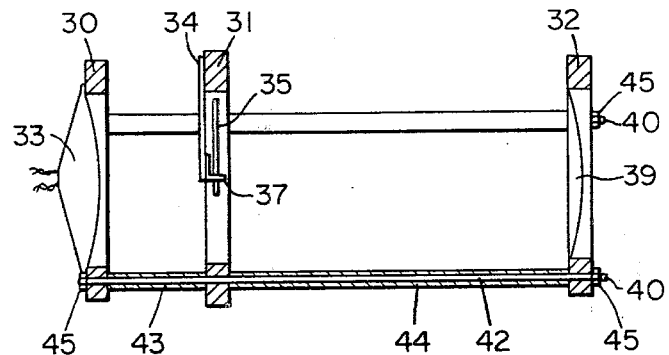
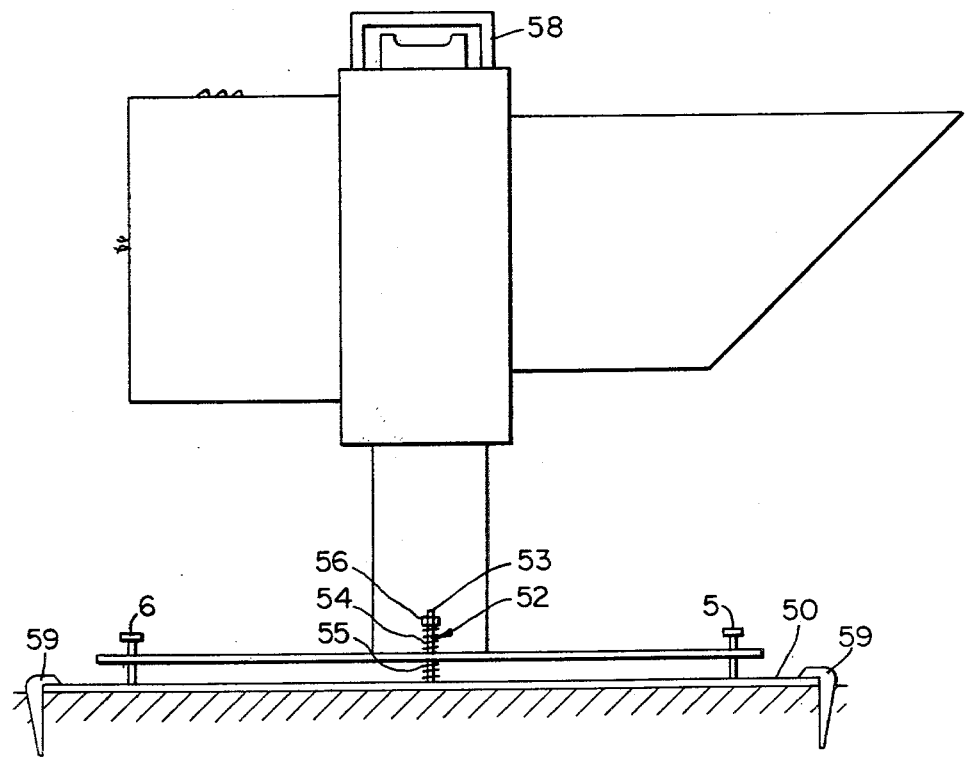

APPROACH SLOPE INDICATORS

The present invention relates to a visual approach slope indicator for airfields.

Hitherto visual approach slope indicator units of the sharp transition type have taken the form of a rectangular box housing at least two projectors, each projector comprising; a light source, a red-passing filter and a plano-convex lens. The latter being coaxial and disposed so as to produce a divergent beam of light, the upper half of which is white and the lower half of which is red; there being a sharp transition between the two.

In operation the indicator units are set so that the angle formed between the transition interface and the runway is that which gives an indication to approaching aircraft of the correct approach slope. If an incoming aircraft is above the transition plane the pilot of the aircraft will see the white light and if below it he will see the red light. Thus the indicator unit provides the pilot with a guide to the desired flight path. Further, a system which employs several indicator units, in which the transition interfaces are set at different approach slopes, can be used to provide the pilot with further information as to how far his aircraft is above or below the desired flight path.

It will be appreciated that within each indicator unit the projectors are set at the same angle. Several projectors, usually three, are employed to give the required intensity and desired shape of light, and to maintain an adequate output in the event of failure of one light source.

From the point of view of flight safety it will be appreciated that it is important that the approach slope indicator must maintain exactly the desired angle between the interface and the runway. An error of 1°, means 50 ft of height at the important 1000 yard stage.

If the angle is in the first instance set incorrectly, or subsequent to being set correctly the angle changes then the pilot of an incoming aircraft will be misled into following an incorrect approach slope and this could lead to an aircraft accident.

Since it is desirable that approach slope indicator units have as low an inertia as possible to reduce damage in the event of impact by aircraft, the indicator units so far produced have necessarily been of a light sheet metal construction, usually a rectangular metal box supported on cross bars.

This has the disadvantage that the forces necessarily applied to open the unit and to adjust one projector or even to renew a light source or a cracked lens are liable to distort the unit and render the setting of the other projectors inaccurate, which considerably increases the time required to render the unit operable. This problem is aggravated by the fact that any re-adjustment of the projectors must take place in situ, and on cold days the correct approach slope will be more difficult to achieve manually. It will be appreciated that it is important to rectify a defective unit as quickly as possible to avoid delays to incoming aircraft, or forcing them to land without the benefit of the unit's guidance.

The invention provides a rigid yet low inertia structure which substantially avoids the problem of distortion as a result of projector adjustment or windage and which can be maintained in almost continuous operation even though projector adjustment may be required.

According to the present invention an approach slope indicator unit comprises at least two projection tubes immovably mounted on a support assembly each tube having removably mounted therein a pre-alignable projector. In a preferred form the approach slope indicator unit incorporates a base-plate and adjusting means for adjusting the approach slope indicator unit to the required angle of elevation. The adjusting means may comprise at least three jacking screws attached to the base-plate.

The projection tubes of which there are preferably three, are also preferably arranged in laterally parallel array.

The approach slope indicator unit may include projection tubes each having a vented cowl at their light source end. The approach slope indicator unit may also include a chinometer stand to facilitate adjustment of the unit to the correct angle of elevation.

A pre-alignable projector suitable for use in the projection tubes may comprise; a light source, a red-passing filter and a divergent lens immovably combined, and disposed coaxially to produce a divergent beam, one half of which is white light, the other half of which is red light.

Preferably the pre-alignable projector has the light source, the red-passing filter and the divergent lens mounted on separate sub-frames, the sub-frames being rigidly linked by at least two connecting rods. The red-passing filter may be arranged to move transversely with respect to its sub-frame to adjust the composition of the beam.

Pre-alignment of the light source, the red-passing filter and the divergent lens may be achieved by spacer brushes which fit over the rods and between the annuli.

According to an optional feature of the invention an approach slope indicator unit may be of portable construction wherein the base-plate is supported upon a datum-plate by at least one flexible tie, disposed with respect to the adjusting means so that the approach slope indicator unit can be adjusted to the required angle of elevation. In a preferred form the portable approach slope indicator unit has two flexible ties each disposed one at either side of the datum plate.

The flexible ties may comprise a screw member rigidly attached to the datum plate and having upper and lower compression springs between which the base plate is positioned, the springs and baseplate being clamped together under compression by an adjusting nut, such that the base plate is free to pivot about the flexible ties to enable the approach slope indicator unit to be adjusted to the required angle of elevation. The portable approach slope indicator unit is appropriate for use on temporary air fields, or airfields not normally receiving certain types of, perhaps larger aircraft, and the datum plate securable to the ground by suitable pegs driven therein.

Each projector may be pre-aligned on a jig comprising at least two threaded rods, each rod associated with six threaded nuts, whereby producing the projectors, the sub-frames may be mounted on the threaded rods and adjusted with respect to each other until their correct disposition is determined in order to facilitate projector assembly.

The invention allows a fundamental change in the construction of indicator units. Projection tubes can be inherently suited to meet the existing rigidity and low inertia requirements if made from plastics material. Withdrawal or local adjustment of the pre-aligned projectors can easily be arranged to require the minimum of force, and this fact together with the fact that the tube supporting structure need only, so to speak, clamp the tubes rather than house the system enables for greater lee-way than before in the amount of material of the supporting structure which will provide the required rigidity without constituting an impact damage risk.

Moreover, the licence afforded by the invention to construct an indicator unit of smaller bulk than heretofore, further enables the use of a pillar or like support which is readily frangible on aircraft impact, while the construction of the unit per se can be such that the aircraft can push it aside, or at least not shatter the unit so as to give rise to small pieces of debris liable to be ingested by the aircraft engines.

Further the invention will also facilitate the use of lenses of various focal lengths, the distances between the annuli being adjustable such that the edge of the red-passing filter is focussed at infinity for each lens.

An approach slope indicator unit in accordance with the present invention will now be described by way of example with reference to the accompanying drawings of which:-

FIG. 3 shows a sectional elevation of pre-aligned projector, FIG. 5 shows an elevation of the portable approach slope indicator shown in FIG. 4.

Figure 1:
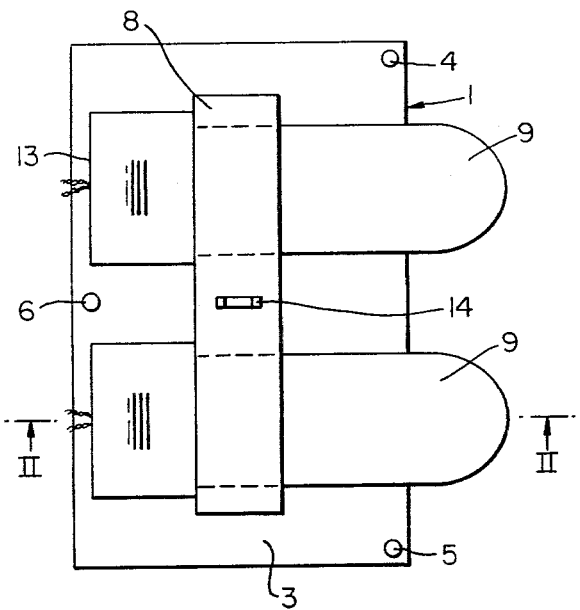
FIG. 1 shows a plan view of an approach slope indicator unit.
Figure 2:
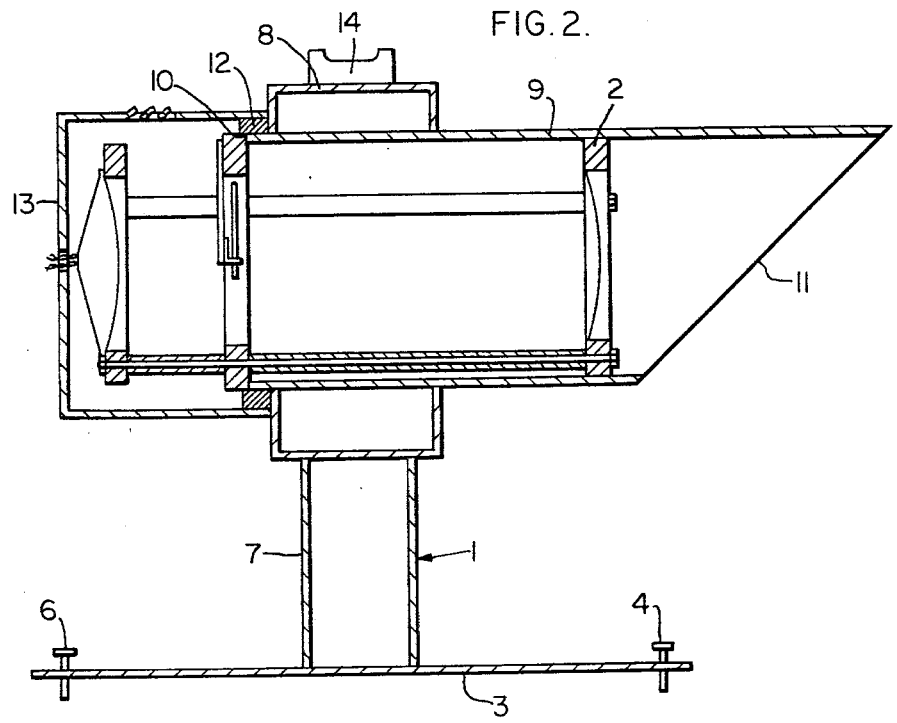
FIG. 2 shows a sectional elevation of the approach slope indicator unit shown in FIG. 1 on the line II—II.

An approach slope indicator unit as shown in FIGS. 1 and 2 comprises a support assembly 1 which houses two pre-aligned projectors 2.

The support assembly 1 includes a base-plate 3 mounted on two forwardly positioned jacking screws 4 and 5, and one rearwardly positioned jacking screw jack 6. Immovably attached to the baseplate 3 is a pedestal 7 to which a projection tube box 8 is immovably attached. The pedestal 7 is tubular and is sufficiently brittle to be readily severed by aircraft impact. Two projection tubes 9 of plastics material are immovably housed in the projection tube box 8, each projection tube has a squared rearward end 10 and an angled forward end 11.

The rearward end extends beyond the box 8 into a positioning member 12 to which a louvered cowl 13 is securable. The top surface of the box carries a clinometer stand 14. Each projection tube 9 houses a pre-alignable projector 2. The pre-aligned projector 2 shown in FIG. 3 comprises a lamp sub-frame 30 a filter sub-frame 31 and a lens sub-frame 32. The sub-frame 31 is adapted to mate with the positioning members 12, the lens sub-frame being a slide fit within the projection tubes 9.

The lamp sub-frame 30 has mounted thereon a light source 33 which produces a beam of light.

A red-passing filter 34 is slidably mounted on the filter sub-frame, the red-passing filter 34 being transversely adjustable by means of adjusting screws 35 and 36 and threaded angle brackets 37 and 38 (adjusting screw 36 and angle bracket 38 not shown).

The lens sub-frame 32 houses a plano-convex lens 39 for producing a divergent beam of light, such that the edge of the red-passing filter is focused at infinity.

The sub-frames are mounted on connecting rods 40, 41 and 42, these being on the same radius and at 120° to each other (connecting rod 41 is not shown). The sub-frames are axially displaced by 3 sets of spacer bushes, each set comprising spacer bushes 43 and 44. The spacer bushes 43 and 44 are cut to required lengths so that when the sub-frames are rigidly clamped by bolts 45 the projector emits a divergent beam of light the upper half of which is white and the lower half of which is red, there being a sharp transition between the two halves.

Refering to FIG. 2 the approach slope indicator unit is set to the required angle while a clinometer is positioned on the clinometer stand 14. The angle of the platform 1 is adjusted by means of jacking screws 4, 5 and 6 until the clinometer gives the reading corresponding to the correct approach slope. When this is achieved the pre-aligned units 2 are inserted into the projection tubes 9 until the filter sub-frames mate with the positioning members 12 to be secured thereto. The louvered cowls 13 are then fitted into position.

Figure 4:
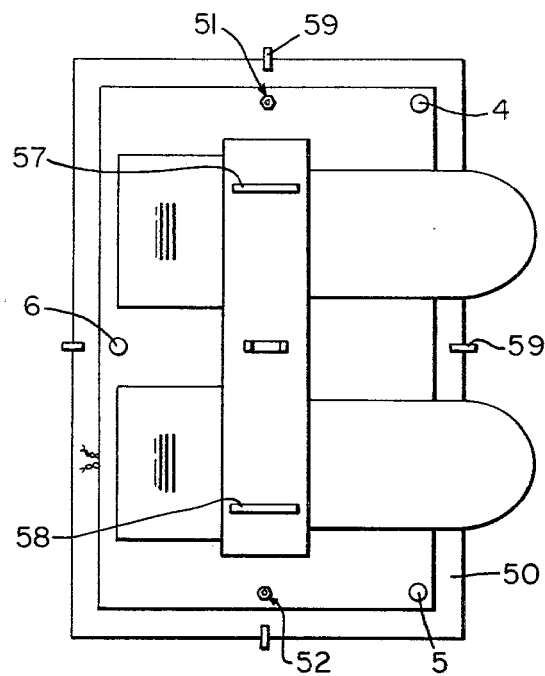
FIG. 4 shows a plan view of a portable approach slope indicator unit.

A portable approach slope indicator as shown in FIG. 4 and FIG. 5, includes a datum plate 50 which is flexibly attached to the base-plate 3 by means of flexible ties 51 and 52. The ties are disposed centrally between the forwardly and rearwardly positioned jacking screws, 4 and 5; and 6 respectively. Each flexible tie comprises an adjusting screw 53, and upper and low compression springs 54 and 55 respectively, between which the base-plate 3 is sandwiched. Compression is induced into the springs 54 and 55 by means of an adjusting nut 56. The portable unit also includes handles 57 and 58 disposed one at either side of the projection box 8.

In use the portable unit may be carried to the selected airfield site and secured to the ground by suitable pegs 59. The unit is then adjusted in the same manner as the non-portable unit described with respect to FIGS. 1 and 2.

Figure 6:
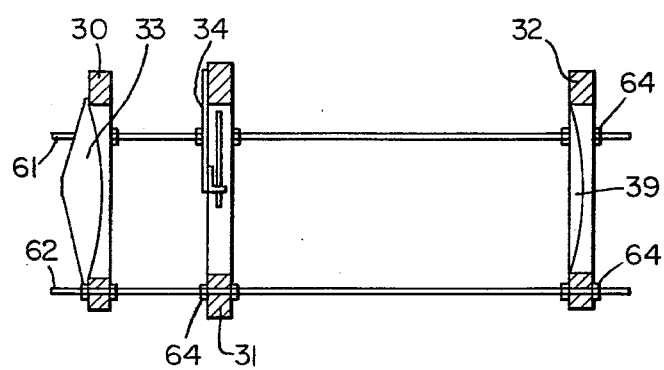
FIG. 6 shows a pre-alignment jig for pre-aligning a projector.

A jig for pre-aligning the projector is shown in FIG. 6. The jig comprises a threaded nuts 64 and three threaded rods 61, 62 and 63 (rod 63 not shown in the figures), the rods each being a slide fit with respect to the sub-frames. The light source 33, the red-passing filter 34 and the plano-convex lens 39 are mounted, by means of their respective sub-frames, on the rods 61, 62 and 63. By means of the threaded nuts 64 the light source 33, the red-passing filter 34, and the lens 39 are coaxially adjusted to give the desired split beam of light. To ensure that the beam of light is made up of half red light and half white light the red-passing filter 34 may be vertically adjusted by means of the adjusting screws 35 and 36.

It will be appreciated that the above embodiments are described by way of example and that the invention can be realized in different forms. The pre-aligned projector 2 could be such that the sub-frames 30, 31 and 32 are radially clamped within a single tube avoiding the need for the connecting rods 40, 41 and 42; the spacer bushings 43 and 44 taking the form of cylinders each having an outside diameter equivalent to that of the annuli.

A bench system could be used to pre-align the projectors the system so designed that the three sub-frames 30, 31 and 32 could be mounted on separate blocks each block movable on a slide way by screw adjustment.

I claim:

1. An approach slope indicator unit comprising a plurality of projection tubes, a corresponding number of projectors, each mounted in a projection tube, a support assembly carrying said projection tubes said projectors each comprising a light source, a divergent lens and a connector having a first and second ends, said light source immovably mounted at said first end of said connector and said divergent lens immovably mounted at said second end of said connector and including a color filter fixed between said first and second ends of said connector, each said projector pre-aligned to produce a split beam of light of two colors and slidably insertable into said projection tubes.

2. An approach slope indicator unit as claimed in claim 1 and wherein the said support assembly has projection tubes adjustable to the correct elevation angle by adjusting means.

3. An indicator unit as claimed in claim 2 and wherein said support assembly comprises a base-plate, and said adjusting means comprises at least three jacking screws on said base-plate, and wherein said projection tubes are immovable with respect to said base-plate.

4. An indicator unit as claimed in claim 1 and wherein said projection tubes are circular in section.

5. An indicator unit as claimed in claim 1 and wherein said projection tubes are in lateral array.

6. An indicator unit as claimed in claim 1 and having two of said projection tubes only.

7. An indicator unit as claimed in claim 1 and having three of said projection tubes only.

8. An indicator unit as claimed in claim 1 having vented cowls removably mounted at the light source ends of said projection tubes.

9. An approach slope indicator unit comprising a plurality of projection tubes, a corresponding number of projectors, each mounted in a projection tube, and a support assembly carrying said projection tubes, said projectors each comprising at least two connecting rods, a first sub-frame, a second sub-frame and a third sub-frame, said first sub-frame having mounted thereon a light source, said second sub-frame having mounted thereon a first color passing-filter and said third sub-frame having mounted thereon a divergent lens, said sub-frames being coaxial and rigidly linked by said connecting rods each said projector pre-aligned to produce a divergent beam one half of which is said first color, each said projector slidably inserted into said projection tubes.

10. A projector as claimed in claim 9 and wherein the said sub-frames are circularly annular.

11. A projector as claimed in claim 9 having beam composition adjustment means of said second sub-frame.

12. An approach slope indicator unit as defined in claim 9 wherein said support assembly comprises a base-plate and at least three jacking screws for providing unit elevation adjustment.

13. A portable approach slope indicator unit comprising at least two projection tubes, and a pre-alignable projector removably mounted within each of said projection tubes, a support assembly to which said projection tubes are immovably attached, said support assembly having a base-plate rigidly fixed thereto, a datum plate having flexible ties upon which the base-plate is supported, the said base-plate having adjusting means in contact with the said datum plate so that the angle of the said base-plate can be adjusted with respect to the said datum plate so that the split beam of light can be adjusted to the correct angle of elevation.

14. A portable approach slope indicator unit as claimed in claim 13 and wherein the said flexible ties are disposed one at either side of the said datum plate.

15. A portable approach slope indicator unit as claimed in claim 13 and wherein each flexible tie comprises a screw member rigidly attached to the said datum plate, an upper compression spring and a lower compression spring, said compression springs mounted on said screw member and said base-plate positioned between said upper and lower compression springs, and adjusting nut mounted on said screw member, whereby said upper and lower compression springs and said base-plate are flexibly clamped between said adjusting nut and said datum plate.

* * * * *